INVENTORS
Chester J. Barecki
Bror W. Henrikson

BY Dawson, Tilton, Fallon
and Lungmus
ATTORNEYS

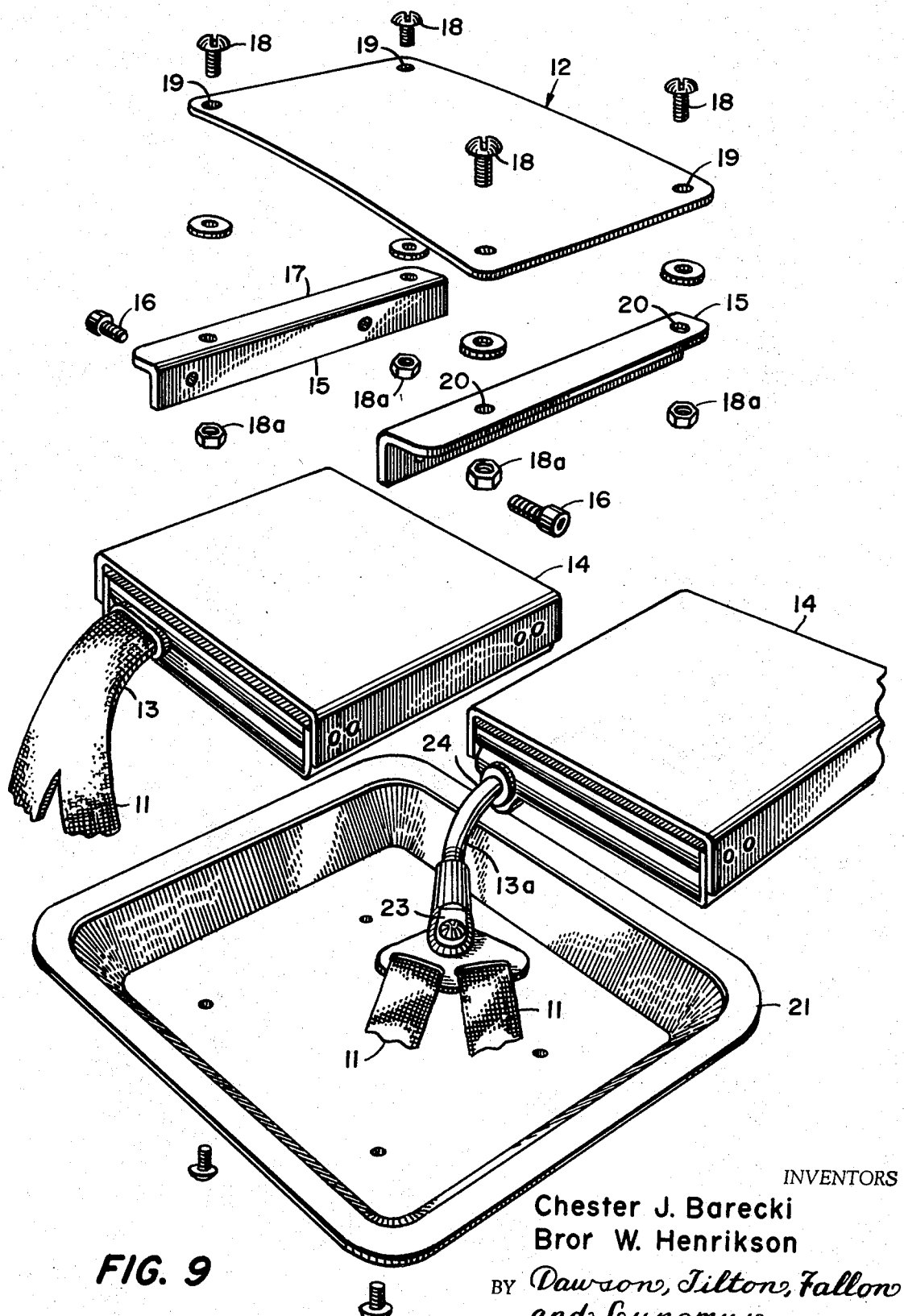

# United States Patent Office 3,534,979
Patented Oct. 20, 1970

3,534,979
SAFETY VEHICLE
Chester J. Barecki and Bror W. Henrikson, Grand Rapids, Mich., assignors to American Seating Company, Grand Rapids, Mich., a corporation of Delaware
Continuation-in-part of application Ser. No. 681,287, Nov. 7, 1967. This application May 8, 1969, Ser. No. 822,998
Int. Cl. B60r *21/10*
U.S. Cl. 280—150                7 Claims

ABSTRACT OF THE DISCLOSURE

The malleable roof of an automobile is utilized in combination with a safety belt or harness means for absorbing kinetic energy and checking the forward movement of an occupant of a car in a case of sudden deceleration of the car, as in the case of an accidental collision or other accident. The harness is secured to the lower portion of the car and extends about the occupant with the upper end of the harness being connected to a bearing plate on the top of the car secured in contact with the top surface of the roof of the car. Should the car suddenly be halted, forward movement of the occupant places stress upon the bearing plate and the malleable roof material bends and yields to a minor degree, but enough to absorb most of the energy and prevent injury to the occupant. At the same time, the bending of the roof of the vehicle occurs behind the occupant and in front of the occupant of the back seat, so that such bending does not injure anyone. The upper end of the harness may be connected directly to the bearing plate on the roof of the vehicle, or it may be connected to an inertia reel which in turn is connected to the bearing plate on the roof of the car. The inertia reel is of the type which enables the operator or occupant to move freely in his seat, under ordinary driving conditions, but which prevents forward movement of the occupant in the case of abrupt deceleration of the car.

RELATED CASE

This application is a continuation-in-part of our copending application Ser. No. 681,287.

BACKGROUND AND SUMMARY

In Pat. No. 2,899,976, a safety harness is secured within a vehicle and extends about the occupant, the upper end of the safety harness being connected to an inertia reel, which, in turn, is secured to rigid metal beams at the top of the car. The inertia reel or automatic reel is of the type shown in Pat. No. 2,899,146.

We have now discovered that instead of attaching the upper end of the harness to rigid frame members, it is possible to secure the harness to a bearing plate engaging the top surface of the roof or otherwise anchored firmly to the roof so that as stress is applied to the top of the harness, the malleable character of the roof is utilized in a bending operation which absorbs energy and gradually checks the forward movement of the occupant. Thus injury to the occupant is prevented very much the same as in the case of the gradual application of brakes in the stopping of an automobile. A retainer plate or bearing plate is utilized to apply stress upon a relatively wide area of the car top so that the car top bends under the force of the sudden tension but does not break, and the deformation that does take place is in an area where no harm occurs to the occupants of the car.

We prefer to employ an inertia type reel which enables the operator to move normally in the operation of the car while in the case of sudden or abrupt deceleration, the harness does not yield and the retainer plate on the roof is utilized for holding the harness and thereby the occupant of the car against forward movement.

DRAWINGS

Figures 1, 2:
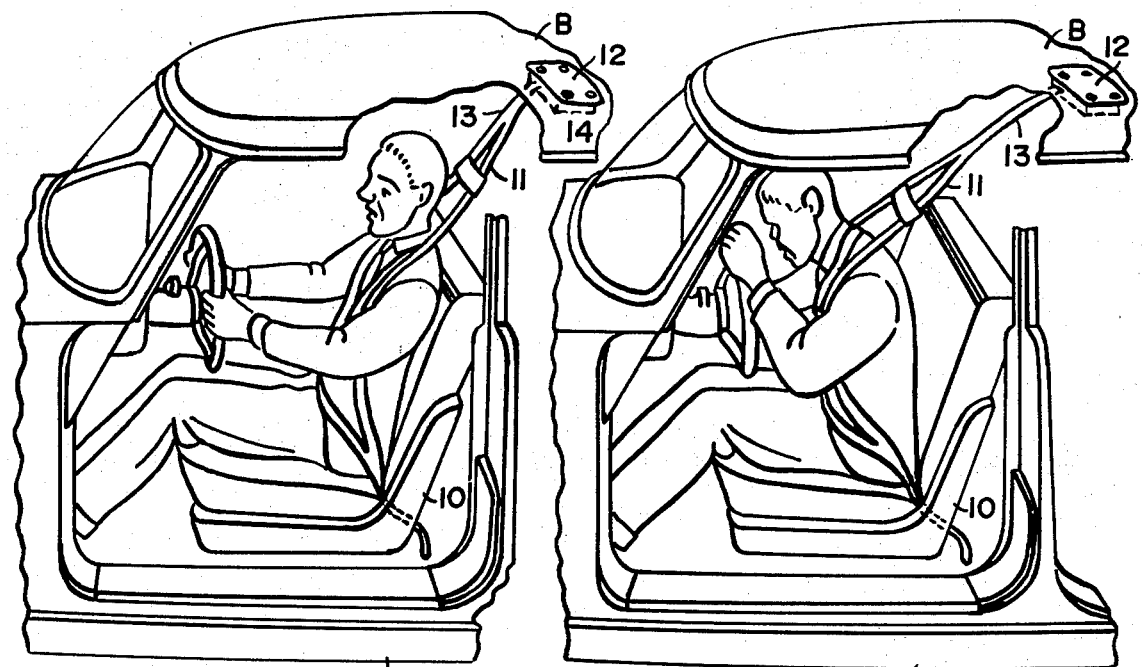
Figures 3, 4:
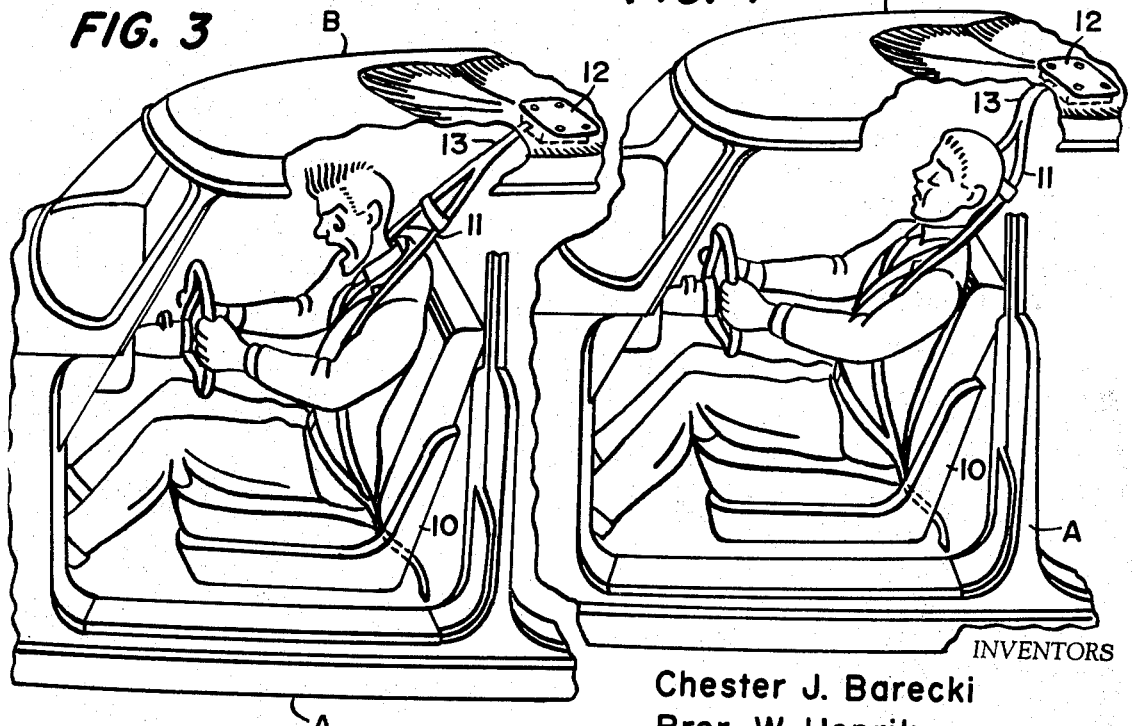
Figures 5, 6:
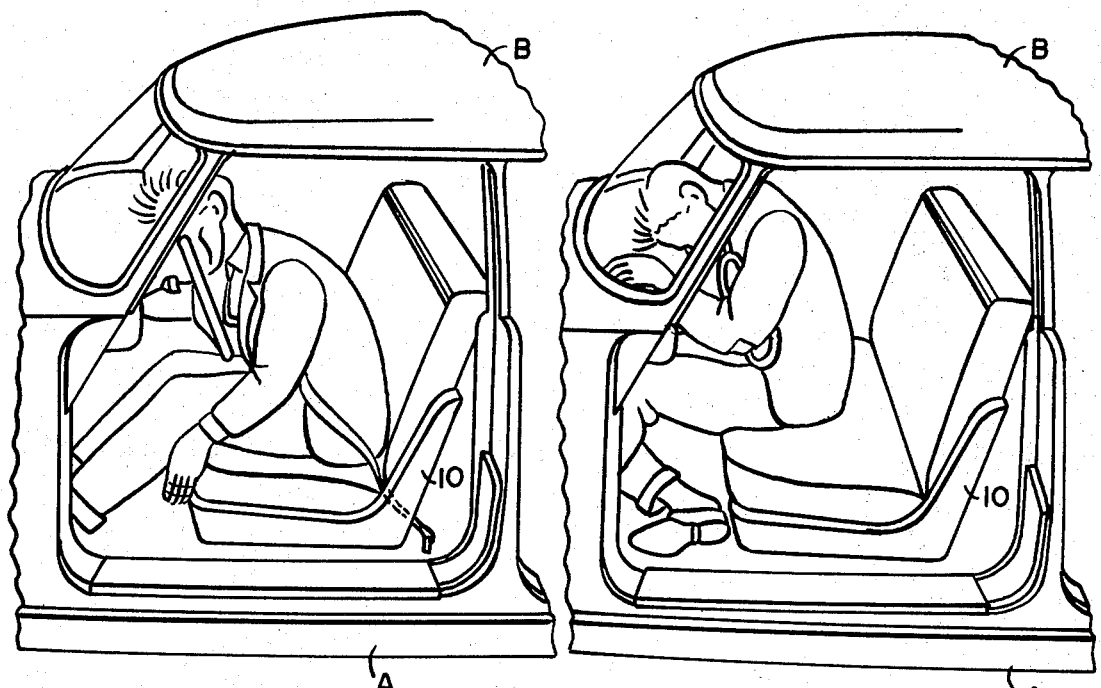
Figure 7:
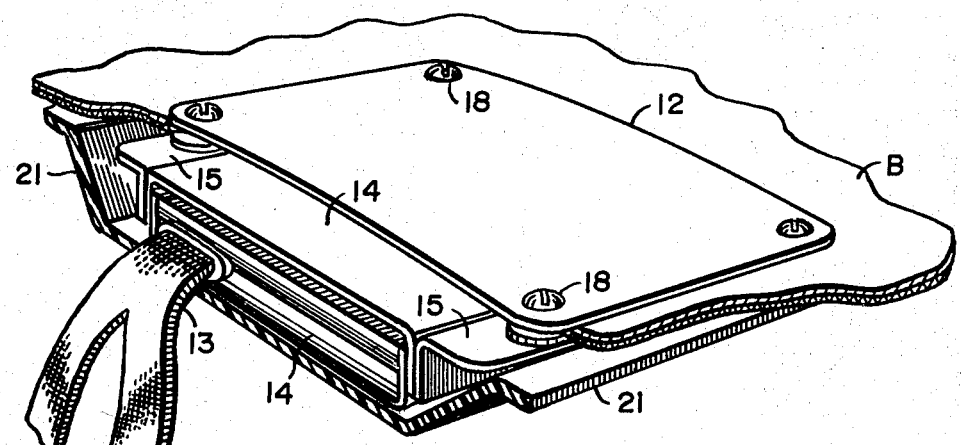
Figure 8:
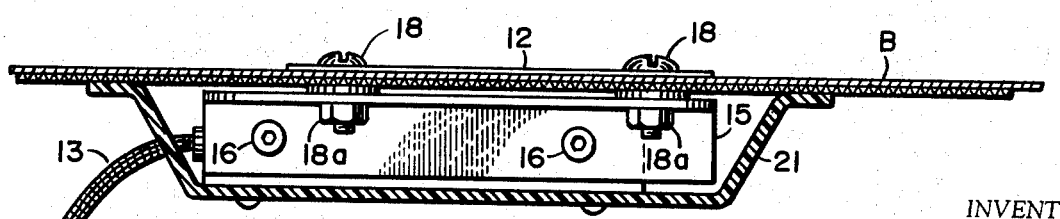

In the drawings, FIG. 1 is a broken side view in elevation of an automobile equipped with safety harness having the lower end secured to the floor portion of the vehicle and the upper end secured to the roof of the vehicle, the driver being in normal driving position; FIG. 2, a view similar to FIG. 1 showing the driver leaning forward while in normal driving operation, the forward movement being permitted by the inertia reel; FIG. 3, a view similar to FIG. 1 but showing the car in a position of sudden deceleration, the harness being checked so as to hold the occupant against forward movement; FIG. 4, a view similar to FIG. 3 but showing the harness being utilized to prevent whiplash which normally occurs after sudden deceleration; FIG. 5, a view similar to FIG. 1 but showing a car equipped only with a safety belt and showing injury to the driver when there is a sudden deceleration of travel; FIG. 6, a view similar to FIG. 5 but showing the occupant of the car without a safety belt and being thrown forward; FIG. 7, a broken enlarged view of a safety reel assembly secured to a roof retainer plate and with the top of the harness in the form of a strap type member; FIG. 8, a longitudinal section view of a structure shown in FIG. 7 and in which a cable is employed instead of the strap for actuating the inertia reel; and FIG. 9, an exploded perspective view of the safety reel assembly.

DETAILED DESCRIPTION

In the illustration given in the drawings, A designates an automobile equipped with a roof B. In the automobile, a seat 10 is provided for the occupant and a harness 11 has its lower end secured to the lower portion of the car and its upper end secured to the roof of the car by means of a bearing plate or retainer plate 12. We prefer to secure the lower end of the harness to the floor of the car or to any suitable lower portion of the car frame. If desired, the harness may be of the type shown in Pat. No. 2,898,976 or of any suitable type. We prefer to have the harness extend about one or both shoulders of the occupant and extend then upwardly, terminating in a cable or strap 13, which actuates the inertia device or reel 14. A suitable inertia device is shown in Pat. No. 2,899,146. Since such inertia reels are well known in the art, a further description herein is believed unnecessary.

In the illustration given, the inertia structure 14 is secured to side rails of brackets 15 by means of screws 16 and the rails 15 have outwardly-extending flanges 17, which are, in turn anchored to the retainer plate 12 by bolts 18, which extend through openings 19 in the plate and through the openings 20 in the flanges 17 and are engaged by nuts 18a. Such an assembly permits ready disassembly and assembly of the parts while at the same time anchoring the harness to the roof plate 12.

If desired, a plastic enclosure 21 may be secured about the inertia reel assembly parts, as shown more clearly in FIGS. 7 and 8.

Referring more directly to FIG. 9, the upper end of the harness may be in the form of a divided strap which is narrowed at its top and merges into a single strap which enters the inertia reel casing 14. However, if desired, the strap members 11 may be secured to a crossbar 22 which is pivotally mounted on a fitting 23, threadedly connected to a cable 24.

From the foregoing, it will be clear that the harness structure which extends about the occupant is firmly secured at the lower portion of the vehicle, such as the vehicle floor or lower portion of the seat, and that its top is secured to a bearing plate anchored to the roof of the car, rearwardly of the occupant. Whether an inertia reel is employed between the top of the harness and the bearing plate is optional, but we prefer to employ the inertia reel between the top of the harness and the retainer plate because it permits the driver to move normally and freely in the operating of the vehicle while at the same time, because of the automatic checking of the vehicle strap against movement in case of sudden deceleration, the full force of the pull exerted upon the retainer plate is felt so as to check forward movement of the occupant.

The shape, width, thickness, etc. of the retainer plate can be modified widely, but there should be always sufficient area of contact between the plate and the roof to cause the roof to yield or bend without tearing the roof. If there are two seats and two occupants, we prefer that the retainer plates place sufficient stress upon the roof of the vehicle to sustain at least a pull of 10,000 lbs. With a roof of the usual type consisting of malleable metal or the like, it is found that a plate several inches in width and length is sufficient to bring about a deformation of the vehicle under stress of 4,000–5,000 lbs. so as to provide an absorption of energy which is equivalent to a strong braking operation.

By way of example, we have used a 7-gauge plate which is 3/16" in thickness and has a width of 8½" and a length of 9½", the plate being secured to the roof by four bolts of the type shown in FIG. 9. With an ordinary metal automobile roof, this was found to give a deformation of from 1 to 2 inches, and this deformation was highly effective in checking forward movement of an operator without injury, the deformation being generally frusto-pyramidal in shape.

In another operation, the plate was 11 gauge, having a thickness of 1/8", a width of about 8", and length of about 9". Comparable results were obtained.

The size of the plate and the character of the roof are not critical because automobile manufacturers utilize roofs of relatively thin malleable metal and it is merely necessary to use a retainer plate which is wide enough to cause a bending of the roof structure under the high stresses above indicated, and thus there is wide latitude in the choice of plates and their dimensions. The retainer plates, however, are wide enough to distribute the force over an area of the roof so that no tearing of the roof occurs and an effective bending of the roof is produced which serves as a braking action and an absorbing of the energy applied.

The plate may be square, rectangular, circular, or of any desired shape, and its area is such that when applied to a roof which yields locally under high tensile stress, the downward deflection of the engaged area of the roof is about .5–3" under the stress of 3,000–5,000 lbs. We prefer to apply to the roof a plate engaging an area which will bring about a downward yielding of the engaged roof portion of about 1–2 or 2.5" under the stress of 3,000–5,000 lbs.

As illustrated in the drawings, the downward drawing or deflection of the engaged portion of the roof is behind the occupant so that the deformation of the roof of the car is not near the head of the occupant and presents no hazard during or following the accident. We thus utilize a portion of the automobile itself to bring about the protective braking action, and the damage to this portion of the vehicle does not interfere with the operation of the vehicle or present any form of hazard.

In addition to the yielding of the roof, which may be formed of metal or metal covered with plastic or of a plastic itself, there is a slight recovery of the deformed roof portion after the stress is applied. For example, in the case of an automobile having a typical metal roof thickness of .048" to which was applied a rigid plate of 3/16" having a width of 8½" and a length of 9½", as illustrated in FIGS. 1–4, it was found that with a stress of about 5,000 lbs. there was a deflection of about 2½" and a recovery after release of the stress to a deflection or permanent set of about 2".

Besides being located in an area in which deflection rearwardly of the occupant does no harm to the occupant, the roof is utilized as a wide diaphragm which because of the relative thinness of the metal, etc. permits a rigid bearing plate to be positioned for gathering the resistance of an area of thin metal to provide the necessary braking force for protection of the occupant. In addition to the recovery of a portion of the deflection after the accident, the deformed roof portion can be readily pressed back into its original shape and the roof can be again utilized as a protective braking means.

We claim:

1. In combination with a vehicle having a roof portion yieldable locally under heavy tensile stress, a bearing plate anchored to and exteriorly of said roof portion and engaging a deformable area thereof, a seat for an occupant in said vehicle facing in a forward direction, a safety harness for said occupant having one end secured to a lower portion of the vehicle and an upper end secured to said bearing plate rearwardly of said seat whereby upon accidental sudden deceleration of the vehicle causing the body of the occupant to be thrown forward, said harness directs the force of movement of said occupant against said bearing plate and thereby against the roof portion of the vehicle to deform said roof portion and to absorb the energy of sudden deceleration, said bearing plate being of sufficient area to deflect the engaged roof portion downwardly about .5–3" under the stress of 3,000–5,000 pounds.

2. The structure of claim 1 in which an inertia reel is interposed between the roof portion engaged by said plate and the upper end of said harness.

3. The structure of claim 1 in which said bearing plate area produces a deflection of about 1–2.5" under the stress of 3,000–5,000 pounds.

4. In combination with an automobile having a roof yieldable locally under heavy tensile stress, a bearing plate mounted exteriorly on said roof and engaging a deformable area thereof, a forwardly-facing seat in said vehicle for an occupant, a safety harness for said occupant having a lower end anchored to a lower portion of the automobile and an upper portion extending about a shoulder of said occupant and anchored to said roof bearing plate rearwardly of said seat, an inertia reel between the upper end of said harness and the roof portion engaged by said plate, and means securing said plate and inertia reel to clamp said engaged roof portion therebetween and anchor said harness to said bearing plate, said bearing plate being of sufficient area to deflect the engaged roof area downwardly about .5–3" under the stress of 3,000–5,000 lbs.

5. The structure of claim 4 in which said bearing plate has an area which deflects the engaged roof portion downwardly about 1–2" under the stress of 3,000–5,000 lbs.

6. In combination with a vehicle having a roof yieldable locally under heavy tensile stress, a bearing plate anchored to and exteriorly of said roof and engaging a deformable area thereof, a seat for an occupant in said vehicle, and a safety harness for said occupant having one end secured to a lower portion of the vehicle and an upper end secured to said roof bearing plate rearwardly of said seat whereby, upon accidental sudden deceleration of the vehicle causing the body of the occupant to be thrown forward, said harness directs the force of movement of said occupant against said bearing plate and thereby against the roof of the vehicle to deform the same and to absorb the energy of sudden deceleration, said bearing plate being of sufficient area to develop a generally frusto-pyramidal type deformation under the stress of 4,000–5,000 pounds.

7. In combination with an automobile having a malleable metal roof which yields locally under heavy tensile stress, a generally rectangular bearing plate mounted exteriorly on said roof and engaging a deformable area thereof, said bearing plate being of sufficient area to develop a generally frusto-pyramidal type deformation under the stress of 4,000–5,000 pounds, a seat for an occupant in said vehicle, a safety harness for said occupant having a lower end secured to a lower portion of the automobile and an upper portion extending about a shoulder of said occupant and secured to said roof bearing plate rearwardly of said seat, and an inertia reel between said plate and the upper end of said harness permitting said occupant to move freely on said seat but checking outward movement of said harness in the case of accidental sudden deceleration of the automobile which tends to throw the body of the occupant forwardly, said harness directing the force of forward movement of the occupant upon said bearing plate to deform a portion of said roof without tearing said roof.

References Cited

UNITED STATES PATENTS

| 2,898,976 | 8/1959 | Barecki | 280—150 |
| 2,899,146 | 8/1959 | Barecki | 242—107.4 |
| 3,289,792 | 12/1966 | Son Moberg | 280—150 |
| 3,371,960 | 3/1968 | Bayer et al. | 280—150 |

BANJAMIN HERSH, Primary Examiner

R. R. SONG, Assistant Examiner

U.S. Cl. X.R.

297—386, 389